United States Patent
Li et al.

(10) Patent No.: US 11,477,126 B2
(45) Date of Patent: Oct. 18, 2022

(54) NETWORK DEVICE AND METHOD FOR PROCESSING DATA ABOUT NETWORK PACKETS

(71) Applicant: Huawei Technologies Co., Ltd., Shenzhen (CN)

(72) Inventors: Xin Li, Shenzhen (CN); Jianping Xie, Nanjing (CN); Chuntao Wang, Nanjing (CN); Hao Wu, Nanjing (CN); Jun Liu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/090,550

(22) Filed: Nov. 5, 2020

(65) Prior Publication Data

US 2021/0144097 A1    May 13, 2021

(30) Foreign Application Priority Data

Nov. 7, 2019    (CN) .......................... 201911083140.9

(51) Int. Cl.
*G01H 9/00* (2006.01)
*H04L 47/2441* (2022.01)
*H04L 41/142* (2022.01)
*H04L 43/026* (2022.01)
*H04L 43/04* (2022.01)
*H04L 47/2483* (2022.01)

(52) U.S. Cl.
CPC ........ *H04L 47/2441* (2013.01); *H04L 41/142* (2013.01); *H04L 43/026* (2013.01); *H04L 43/04* (2013.01); *H04L 47/2483* (2013.01)

(58) Field of Classification Search
CPC . H04L 47/2441; H04L 47/2483; H04L 43/04; H04L 43/026; H04L 41/142
See application file for complete search history.

(56) References Cited

U.S. PATENT DOCUMENTS

| | | | |
|---|---|---|---|
| 6,070,142 A | 5/2000 | McDonough et al. | |
| 10,362,149 B2* | 7/2019 | Biederman | H04L 47/6275 |
| 2007/0043687 A1 | 2/2007 | Bodart et al. | |
| 2010/0192225 A1 | 7/2010 | Ma et al. | |
| 2017/0373641 A1 | 12/2017 | Vandenameele et al. | |
| 2018/0316615 A1* | 11/2018 | Shaw | H04L 41/0806 |
| 2019/0293437 A1 | 9/2019 | Szubbocsev | |
| 2020/0162337 A1* | 5/2020 | Jain | H04L 41/20 |
| 2021/0123798 A1* | 4/2021 | Wang | H04L 45/24 |

FOREIGN PATENT DOCUMENTS

| | | |
|---|---|---|
| CN | 108416433 A | 8/2018 |
| CN | 110009530 A | 7/2019 |
| EP | 2821943 A1 | 1/2015 |
| JP | 2017521002 A | 7/2017 |

* cited by examiner

Primary Examiner — Yves Dalencourt
(74) Attorney, Agent, or Firm — Conley Rose, P.C.

(57) ABSTRACT

A network device includes a forwarding plane and an artificial intelligence (AI) circuit. The forwarding plane is coupled to the AI circuit. The AI circuit is configured to process data about network packets from the forwarding plane using a first AI algorithm. The forwarding plane may be directly coupled to the AI circuit, and the forwarding plane may further pre-process the network packets to obtain the data about the network packets.

28 Claims, 3 Drawing Sheets

NETWORK DEVICE AND METHOD FOR PROCESSING DATA ABOUT NETWORK PACKETS

CROSS-REFERENCE TO RELATED APPLICATIONS

This claims priority to Chinese Patent App. No. 201911083140.9 filed on Nov. 7, 2019, which is incorporated by reference.

FIELD

This disclosure relates to the field of artificial intelligence, and in particular, to a network device and a method for processing data about network packets.

BACKGROUND

Variable communications network scenarios (for example, office, financial, university, retail, and the like) have different requirements for network quality. Increased applications and terminal types make the network more unpredictable and dynamic. The more complex the network, the higher the skill requirements for configuration and maintenance personnel. To this end, it may be considered that artificial intelligence (AI) technology is used to process data about network packets, so that AI is used to detect network quality, analyze network applications, identify attack traffic, monitor device status, formulate configuration policies, or the like. However, AI is generally used in terminals or servers, and efficiency is low when AI is introduced into network devices.

SUMMARY

This disclosure provides a network device and a method for processing data about network packets, so as to improve efficiency of using AI in the network device.

According to a first aspect, a network device is provided, where the network device includes a forwarding plane and an AI circuit. The forwarding plane is directly coupled to the AI circuit. The AI circuit is configured to process first data directly from the forwarding plane using a first AI algorithm. The first data includes data about network packets. Because the forwarding plane is directly coupled to the AI circuit, the first data may be directly sent to the AI circuit for processing without passing through another device, thereby achieving efficient AI processing.

With reference to the first aspect, in a first implementation of the first aspect, the forwarding plane shares a first memory space with the AI circuit. The first storage space is provided by a memory of the network device or a specified part of the memory. The forwarding plane is further configured to write the first data into the first storage space. The AI circuit is further configured to read the first data from the first storage space. Transferring data between the forwarding plane and the AI circuit using a bus or an internal communications interface may include four read-write processes, while the shared memory space manner may require only two reads and writes. Therefore, this implementation improves the efficiency of the AI processing.

With reference to the first aspect or the first implementation of the first aspect, in a second implementation of the first aspect, the forwarding plane is further configured to pre-process network packets to obtain the first data. The forwarding plane pre-processes the network packets to share the burden of the AI circuit, so as to improve efficiency.

With reference to the second implementation of the first aspect, in a third implementation of the first aspect, pre-processing network packets means parsing the network packets to obtain the first data, and/or obtaining first statistical data of a flow to which the network packets belong to obtain the first data. The forwarding plane can parse the network packets or collect statistical data of the network packet flow to share the burden of the AI circuit, so as to improve efficiency. For example, the forwarding plane needs to parse some fields of the packets to forward the packets. Therefore, the processing capability of the forwarding plane can be reused through pre-processing in the forwarding plane without additional burden.

With reference to any one of the first aspect, or the first to the third implementations of the first aspect, in a fourth implementation of the first aspect, the AI circuit is further configured to obtain second data about the network packets based on the first data and process the second data using the first AI algorithm, where the operation of obtaining the second data exceeds a calculation capability of the forwarding plane. In the operation performed before execution of the first AI algorithm, the part exceeding the capability of the forwarding plane may be performed by the AI circuit.

With reference to any one of the first aspect, or the first to the fourth implementations of the first aspect, in a fifth implementation of the first aspect, the AI circuit is further configured to: remove abnormal data from the first data, and/or obtain second statistical data of the flow to which the network packets belong. The operation of obtaining the second statistical data exceeds the calculation capability of the forwarding plane.

With reference to any one of the first aspect, or the first to fifth implementations of the first aspect, in a sixth implementation of the first aspect, the AI circuit is further configured to process the third data from the control plane using a second AI algorithm. The third data includes data about control packets, data about a status of the control plane, or a combination thereof. The first AI algorithm and the second AI algorithm may be the same or different.

With reference to the sixth implementation of the first aspect, in a seventh implementation of the first aspect, the control plane is a central processing unit (CPU) of the network device, and the AI circuit includes a chip separate from the CPU. The CPU shares a second storage space with the AI circuit. The second storage space is provided by a memory of the network device or a specified part of the memory. The CPU is further configured to write the third data to the second storage space. The AI circuit is further configured to read the third data from the second storage space.

With reference to any one of the first aspect, or the first to sixth implementations of the first aspect, in an eighth implementation of the first aspect, the network device further includes a control plane. The control plane is a CPU, and the AI circuit includes a chip separate from the CPU.

With reference to any one of the first aspect, or the first to sixth implementations of the first aspect, in a ninth implementation of the first aspect, the network device further includes a control plane, and the network device further includes a control plane. The control plane and the AI circuit are integrated in a single chip, and the single chip is a processor. The AI circuit includes at least one core of the processor, a heterogeneous calculation circuit of the processor, or a combination thereof.

According to a second aspect, a network device is provided. The network device includes a forwarding plane, a control plane, and an AI circuit. The forwarding plane is configured to obtain first data. The first data includes data that is of a field and that is obtained by parsing network packets by the forwarding plane, first statistical data that is of a flow to which the network packets belong and that is obtained by the forwarding plane, or a combination thereof. The control plane is configured to obtain the first data from the forwarding plane and instruct the AI circuit to process to-be-analyzed data. The to-be-analyzed data includes the first data or second data. The second data is obtained by pre-processing the first data by the control plane. The AI circuit is configured to process the to-be-analyzed data from the control plane using an AI algorithm. For example, the first data further includes the network packets. The forwarding plane can share the burden of the control plane and the AI circuit by parsing the network packets or obtaining the first statistical data, so as to improve efficiency. For example, the forwarding plane needs to parse some fields of the packets to forward the packets. Therefore, the processing capability of the forwarding plane can be reused through pre-processing in the forwarding plane without additional burden.

With reference to the second aspect, in a first implementation of the second aspect, the pre-processing includes obtaining second statistical data of the flow to which the network packets belong. The operation of obtaining the second statistical data exceeds the calculation capability of the forwarding plane. In the calculation performed before execution of the AI algorithm, the part exceeding the calculation capability of the forwarding plane may be performed by the control plane. The pre-processing may further include removing abnormal data from the first data.

With reference to the second aspect or the first implementation of the second aspect, in a second implementation of the second aspect, when the to-be-analyzed data includes the first data, the AI circuit is further configured to obtain third data about the network packets based on the first data, and process the third data using the first AI algorithm, where the operation of obtaining the third data exceeds a calculation capability of the forwarding plane. In the calculation performed before execution of the AI algorithm, the part that exceeds the calculation capability of the forwarding plane may be performed by the AI circuit.

With reference to the second implementation of the second aspect, in a third implementation of the second aspect, the AI circuit is configured to remove abnormal data from the first data, and/or to obtain third statistical data of the flow to which the network packets belong, where the operation of obtaining the third statistical data exceeds a calculation capability of the forwarding plane.

With reference to any one of the second aspect, or the first to third implementations of the second aspect, in a fourth implementation of the second aspect, the control plane is a central processing unit CPU, and the AI circuit includes a chip separate from the CPU. The CPU shares a storage space with the AI circuit. The storage space is provided by a memory of the network device or a specified part of the memory. The CPU is further configured to write the to-be-analyzed data into the storage space. The AI circuit is further configured to read the to-be-analyzed data from the storage space.

According to a third aspect, a method for processing data about network packets is provided. The method includes a method performed by the network device according to the first aspect or any implementation thereof.

According to a fourth aspect, a method for processing data about network packets is provided. The method includes a method performed by the network device according to the second aspect or any implementation thereof.

According to a fifth aspect, a computer readable medium is provided. The computer readable medium stores a program executable by a computer. The program includes an instruction for performing the method according to the first aspect or any implementation thereof.

According to a sixth aspect, a computer readable medium is provided. The computer readable medium stores a program executable by a computer. The program includes an instruction for performing the method according to the second aspect or any implementation thereof.

DETAILED DESCRIPTION

An embodiment is described below with reference to FIG. 1 and FIG. 2.

Figure 1:
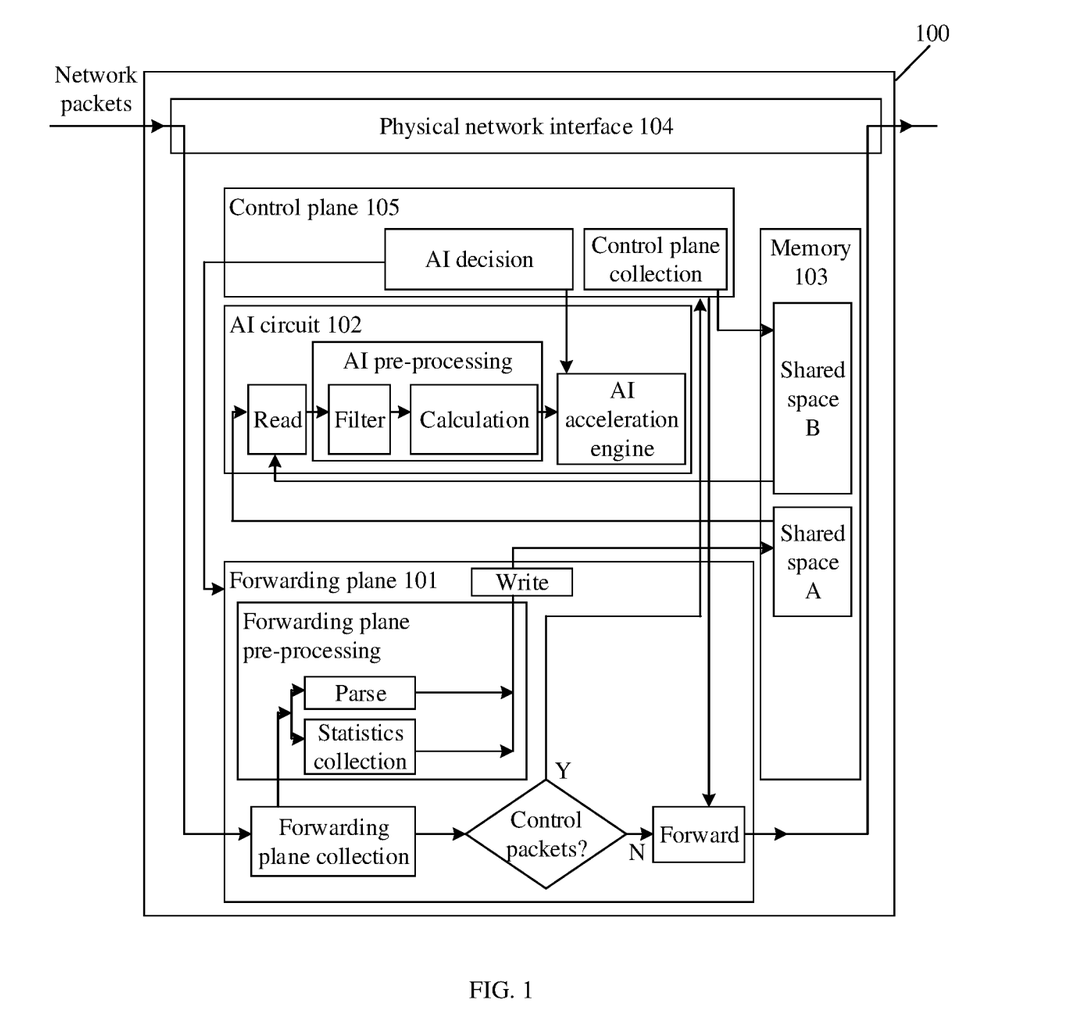
FIG. 1 is a schematic diagram of an example of a network device according to an embodiment.

FIG. 1 is a schematic diagram of an example of a network device according to an embodiment. FIG. 2 is a schematic diagram of another example of a network device according to an embodiment.

The network device 100 shown in FIG. 1 includes a forwarding plane 101, an AI circuit 102, and a control plane 105. The network device 100 shown in FIG. 1 may further include a memory 103 and a physical network interface 104. In a software-defined networking (SDN) architecture or another scenario where control and forwarding are separated, the control plane and the forwarding plane are implemented by different devices. For example, the control plane 210 of the network device 200 shown in FIG. 2 is outside the network device 200. The network device 200 shown in FIG. 2 includes a forwarding plane 201 and an AI circuit 202. The network device 200 shown in FIG. 2 may further include a memory 203 and a physical network interface 204.

A forwarding plane, also referred to as a data plane, is responsible for forwarding data packets. The forwarding plane may be implemented by a forwarding plane circuit. The control plane is responsible for processing control packets. If the control plane and the forwarding plane are in the same network device, the control plane may be implemented by a control plane circuit of the network device. The control plane circuit and the forwarding plane circuit may be implemented by separate chips or may be integrated in one chip. The control plane may alternatively be implemented by a separate device.

The forwarding plane circuit is directly coupled to the AI circuit 102/202 and is not in the same chip. For example, one or some of the plurality of cores of the multi-core CPU serve as a control plane circuit, the other cores serve as a forwarding plane circuit, and the AI circuit 102/202 is in a chip separate from the CPU. For another example, the control plane circuit includes a CPU, the forwarding plane circuit includes a network processor (NP), an application-specific integrated circuit (ASIC), a field-programmable gate array (FPGA), or any combination thereof, and the AI circuit 102/202 is in a chip separate from the CPU or integrated in the CPU. For another example, the communications device is a frame-shaped network device, and the control plane is implemented by a main control card, and the forwarding plane is implemented by a forwarding chip on a line card. The AI circuit 102/202 is on the main control card, or on the line card and separate from the forwarding chip on the line card, or on a separate card. For another example, both the control plane and the forwarding plane are implemented by an NP with a control plane capability, and the AI circuit 102/202 is in a chip separate from the NP. If the control plane is implemented by a separate device, the forwarding plane circuit may include a CPU, an NP, an ASIC, an FPGA, and a forwarding chip of a line card in a network device, or any combination thereof, and the AI circuit 102/202 is in a chip separate from the forwarding plane circuit.

Figure 2:
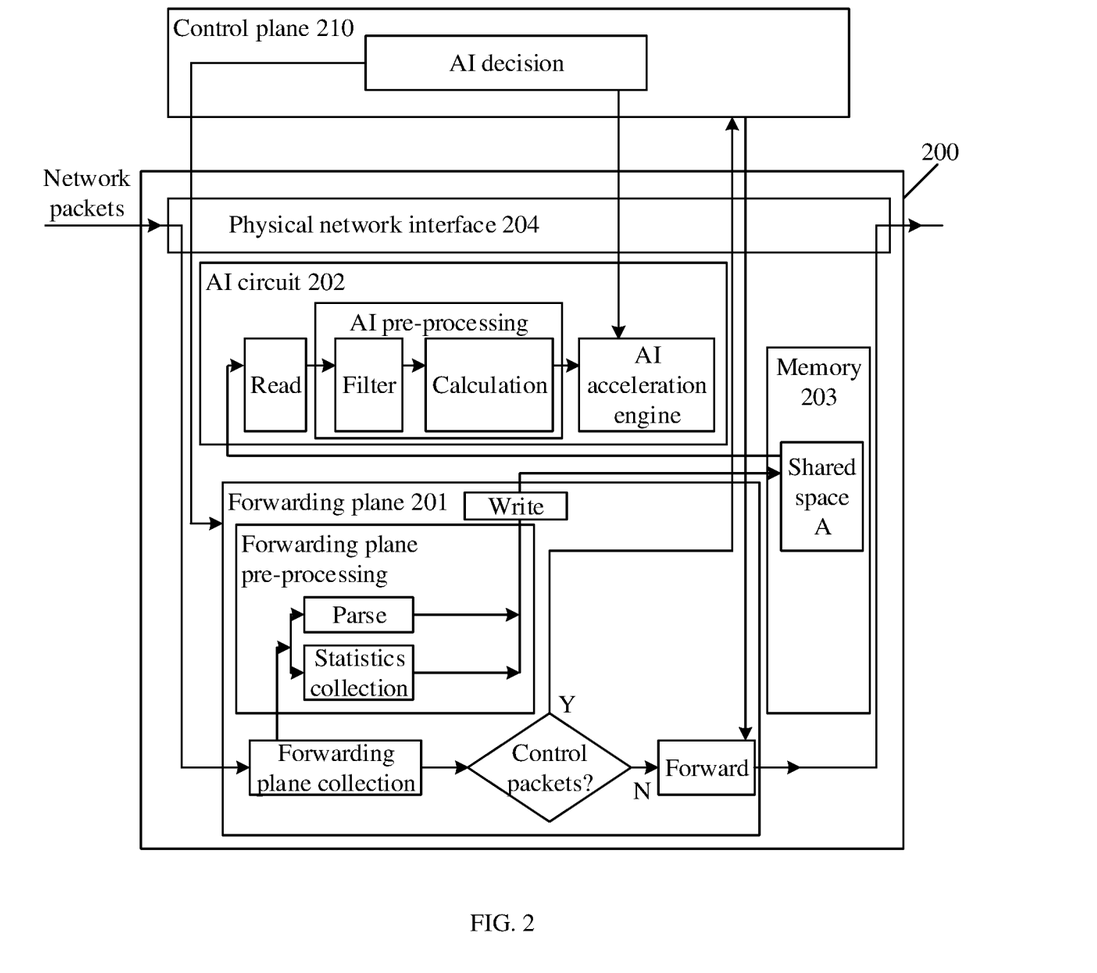
FIG. 2 is a schematic diagram of another example of a network device according to an embodiment.

In the embodiment shown in FIG. 1 and FIG. 2, the forwarding plane 101/201 is directly coupled to the AI circuit 102/202. Therefore, the data about the network packets obtained by the forwarding plane 101/201 can be directly sent to the AI circuit 102/202 for processing without passing through the control plane 105/210, thereby reducing the overhead of the control plane and improving the efficiency of the AI processing.

The physical network interface 104/204 of the network device 100/200 includes one or more interfaces. These interfaces may be wired network interfaces, wireless network interfaces, or a combination thereof. The wired network interface may include an electrical communications interface and/or an optical communications interface. For example, the wired network interface may include an Ethernet interface, where the Ethernet interface may be a twisted pair interface, a coaxial cable interface, or an optical fiber interface. The wireless network interface may include a radio frequency communications interface, an infrared communications interface, or an interface for communication using electromagnetic waves at another frequency band. The wireless network interface may include a plurality of different types of wireless communications interfaces, for example, may include a cellular mobile network interface, a wireless local area network (WLAN) interface, a Bluetooth interface, or a Zigbee interface.

After receiving the network packets using the physical network interface 104/204, the forwarding plane 101/201 may collect statistical data of the network packets related to AI processing and obtain data about the network packets. The forwarding plane 101/201 may collect all received network packets or collect network packets that meet a collection condition. The collection condition generally comes from the control plane 105/210. For example, the control plane 105/210 determines a goal of an AI analysis to determine a corresponding AI policy. An AI policy includes an AI algorithm and one or more flows to be analyzed that are needed to accomplish this goal. Therefore, the collection condition may define one or more flows to be analyzed, and the control plane 105/210 delivers the collection condition to the forwarding plane 101/201. The forwarding plane 101/201 collects network packets belonging to the one or more flows based on the collection condition. Correspondingly, the control plane 105/210 may provide the AI algorithm for analyzing the one or more flows to the AI circuit 102/202. The AI algorithm in the AI circuit 102/202 may alternatively be a default AI algorithm. The AI algorithm is generally trained in advance. The data collected by the forwarding plane 101/201 may also be provided to the AI algorithm training end to enhance the training effect.

For example, the forwarding plane circuit includes a content-addressable memory (CAM) (for example, a ternary CAM (TCAM)). The CAM can collect network packets based on the collection condition. For another example, the NP may be configured to collect network packets. The process of collecting the network packets by the forwarding plane 101/201 generally does not change the original processing procedure of the packets; that is, the network packets are still normally forwarded or sent to the control plane for processing. Therefore, the process of collecting network packets by the forwarding plane 101/201 may be performed before, during, or after the normal packet processing procedure. If network packets are forwarded, the forwarding plane 101/201 sends the network packets using the physical network interface 104/204. If the network packets are received by the forwarding plane 101/201 from a wired network interface in the physical network interface 104/204, the forwarding plane 101/201 generally sends the packets using another wired network interface and/or a wireless network interface in the physical network interface 104/204.

The forwarding plane 101/201 may copy the collected network packets and provide the copied packets to the AI circuit 102/202. The forwarding plane 101/201 may pre-process the collected network packets and only provide a result of the pre-processing to the AI circuit 102/202. The forwarding plane 101/201 may alternatively provide both the copied packets and the result of the pre-processing to the AI circuit 102/202. Therefore, the data about the network packets may include some or all of the network packets, may include data obtained by the forwarding plane 101/201 by pre-processing the network packets, or may include a combination of the foregoing data.

The pre-processing of the collected network packets by the forwarding plane 101/201 may include parsing, statistics collection, or another operation. The pre-processing may include only one of the foregoing operations or a plurality of operations. The forwarding plane 101/201 pre-processes the collected network packets to share the calculation burden of the AI circuit 102/202.

The parsing operation is to extract the value/values of one field/more than one field of the network packets by the forwarding plane 101/201. The forwarding plane 101/201 provides the data based on the extracted value or values to the AI circuit 102/202 as data about the network packets or as a part of the data about the network packets. The parsing operation may extract the value of any field from a data link layer to an application layer of the network packets, for example, source address, destination address, virtual local area network (VLAN) identifier, priority, serial number, protocol type, port number, type-length-value (TLV), or any combination thereof. Output data of the parsing operation may be values of the fields, or may be eigenvalues obtained through calculation based on the values of the fields, for example, eigenvalues that are obtained through calculation based on the values of the fields using a hash function.

The statistics collection operation is to collect statistical data of the flow to which the network packets belong. The forwarding plane 101/201 provides the statistical data of the flow to which the network packets belong to the AI circuit 102/202 as data about the network packets or as a part of the data about the network packets. The flow to which the network packets belong may be a to-be-analyzed flow that is defined by a collection condition, or a flow differentiated based on a statistical requirement. For example, statistical data of a flow may be start time of the flow, end time of the flow, packet length statistical data of the flow, traffic statistical data of the flow, packet sending rule statistical data of the flow, or any combination thereof. The packet length statistical data of the flow may be an average length of packets in the flow, a median of lengths of the packets in the flow, an average of variations in the lengths of the packets in the flow, or any combination thereof. The traffic statistical data may be the quantity of packets per unit time, the amount of data per unit time, or a combination thereof. The packet sending rule statistical data of the flow may be an average of intervals between packets, a median of intervals between the packets, an average of variations in the intervals between the packets, or any combination thereof.

The forwarding plane 101/201 may further perform a preliminary calculation of the data obtained through parsing or statistics collection to obtain data required by the AI circuit 102/202. The preliminary calculation includes simple operations that can be supported by a forwarding plane circuit, such as addition, subtraction, and multiplication; logical AND, OR, and shift; and maximization, minimization, and averaging.

The forwarding plane 101/201 is directly coupled to the AI circuit 102/202. For example, the forwarding plane 101/201 and the AI circuit 102/202 may be directly coupled using a bus or an internal network interface to establish a direct channel. The forwarding plane 101/201 may provide data about the network packets to the AI circuit 102/202 through a direct channel. For example, the bus may be a Peripheral Component Interconnect Express (PCIe) bus, and the internal network interface may be a gigabit Ethernet (GbE) or another faster network interface. To improve the communication efficiency between the forwarding plane 101/201 and the AI circuit 102/202, the forwarding plane 101/201 and the AI circuit 102/202 may be directly coupled in a shared memory manner to establish a direct channel. The forwarding plane 101/201 may provide data about the network packets to the AI circuit 102/202 through a direct channel in a shared memory manner. In this manner, the forwarding plane 101/201 and the AI circuit 102/202 share a segment of memory space, such as a shared space A. The forwarding plane 101/201 writes the data about the network packets into the shared space A. The AI circuit 102/202 reads the data about the network packets from the shared space A. For example, the AI circuit 102/202 may read the data about the network packets into its own cache. The AI circuit 102/202 may periodically read data in the shared space A. The forwarding plane may alternatively instruct the AI circuit 102/202 to read the data after writing the data. The AI circuit 102/202 may mark the read data to avoid repeated reads. The shared space A is provided by the memory 103/203 of the network device 100/200 and may be all or a part of the space of the memory 103/203. For example, if the network device has a plurality of memories 103/203, one of the memories 103/203 may be used to exclusively provide the shared space A. Alternatively, a part of the storage space provided by one or more memories 103/203 may be allocated as the shared space A. Both the forwarding plane 101/201 and the AI circuit 102/202 can access the data in the shared space A.

The memory 103/203 may be a volatile memory, such as a random-access memory (RAM). The memory 103/203 may also be a non-volatile memory, such as a read-only memory (ROM), a flash memory, an optical disk, a magnetic tape, a floppy disk, a hard disk, or a solid state disk. The memory 103/203 may also be any combination of the foregoing types of memories.

The AI circuit 102/202 is a circuit that provides hardware acceleration for an AI application, and may also be referred to as an AI accelerator or a neural network processor (NNP). The AI circuit 102/202 may be implemented by a heterogeneous calculation circuit in a CPU (for example, a single instruction, multiple data (SIMD) circuit in the CPU, a multiple instruction, multiple data (MIMD) circuit in the CPU, a graphics processing unit (GPU) circuit in the CPU), a GPU, an FPGA, an ASIC specifically designed for AI applications, a microprocessor specifically designed for AI applications, or any combination thereof. The AI circuit 102/202 may be a separate chip and may be integrated in one chip with the control plane circuit. The AI circuits 102 and 202 are directly coupled but not integrated together. For example, a dedicated AI processing core may be integrated in the CPU, where the forwarding plane circuit is in a chip separate from the CPU. The AI circuit 102/202 includes an AI processing core in the CPU, and the control plane circuit includes a common core of the CPU.

The AI circuit 102/202 may use a default AI algorithm to process data about network packets that is provided by the forwarding plane 101/201. The AI circuit 102/202 may alternatively receive, from the control plane 105/210, an AI algorithm used to process the data, and then use the AI algorithm indicated by the control plane 105/210 to process the data about the network packets. The AI circuit 102/202 uses a hardware AI acceleration engine to efficiently process the data about the network packets. The processing result of the AI circuit 102/202 may be sent to the control plane 105/210 and/or a network manager. The control plane 105/210 and/or the network manager may set a corresponding forwarding policy based on the processing result and send the forwarding policy to the forwarding plane 101/201. The forwarding plane 101/201 executes the forwarding policy obtained through the AI processing.

Before the AI circuit 102/202 processes the data about the network packets using the hardware AI acceleration engine, the AI circuit 102/202 may pre-process the data about the network packets to obtain pre-processed data about the network packets. Unlike the pre-processing of the forwarding plane 101/201, the pre-processing here is performed by the AI circuit 102/202 and may therefore be referred to as AI pre-processing. The AI pre-processing may include an operation that exceeds a capability of the forwarding plane circuit. For example, the AI pre-processing may include a filtering operation and/or a calculation operation. The calculation operation may include a calculation that exceeds the capability of the forwarding plane 101/201. The filtering operation includes removing abnormal data from the to-be-processed data. For example, one value in the to-be-processed data is significantly too large or too small, and the AI circuit 102/202 may filter the abnormal value. The calculation operation includes calculating extension statistical data of the flow to which the network packets belong. For example, the calculation operation includes floating-point calculation, division calculation, variance/standard deviation calculation, histogram generation, and the like of the to-be-processed data. If the format of the data about the network packets that is provided by the forwarding plane 101/201 is different from the format used by the hardware AI acceleration engine, the pre-processing may further include format conversion for the to-be-processed data.

In addition to forwarding the network packets, the normal packet processing procedure of the forwarding plane 101/201 includes sending the network packets to the control plane 105/210 for processing. Routing protocol packets, network management protocol packets, and the like can be sent to the control plane 105/210 for processing. In some SDN technologies, the first packet of a flow is also sent to the control plane 210 for processing. If an AI analysis needs to be performed on the network packet flow of the control plane 105/210, the control plane 105/210 may send data about control packets and/or data about the status of the control plane to the AI circuit 102/202 for processing. The AI circuit 102/202 uses a corresponding AI algorithm to process data from the control plane 105/210. The AI algorithm used by the AI circuit 102/202 to process the data from the control plane 105/210 and the AI algorithm used by the AI circuit 102/202 to process the data from the forwarding plane 101/201 may be the same or different. The AI circuit 102/202 may or may not pre-process the data from the control plane 105/210.

The control plane 105/210 may collect the control packets to obtain the data about the control packets. Therefore, similar to the data of the network packets that is provided by the forwarding plane, the data about the control packets may include some or all of the control packets, may include data obtained by the control plane 105/210 by pre-processing the control packets, or may include a combination of the foregoing data. The data about the status of the control plane may include one or more of CPU occupancy, memory usage, register status of the CPU, exception information, interrupt information, log information, and the like when a processor processes the control packets. If the control plane 105 is a CPU in the network device 100 and the AI circuit 102 is integrated in the CPU, data can be transferred inside the CPU. If the control plane 105 is a CPU in the network device 100 and the AI circuit 102 is in a separate chip, the control plane 105 may provide data to the AI circuit 102 using a bus or an internal communications interface. If the control plane 210 is outside the network device 200, the control plane 210 may provide data to the AI circuit 202 using the physical network interface 204. If the control plane 105 is a CPU in the network device 100 and the AI circuit 102 is in a separate chip, the control plane 105 may provide data about the control packets and/or data about the status of the control plane to the AI circuit 102 in a shared memory manner. A specific method of the shared memory manner herein is similar to the specific method of the shared memory manner of the forwarding plane 101/201 and the AI circuit 102/202, except that another sharing space B is used. The shared space A and the shared space B may be provided by the same hardware memory or by different hardware memories. The shared space A and the shared space B may not overlap, or may be the same, that is, the same shared space A/B is shared by the control plane 105, the forwarding plane 101, and the AI circuit 102.

Some of the functions implemented by the forwarding plane 101/201, the AI circuit 102/202, and the control plane 105/210 may be provided by hardware or software. For example, the collection, forwarding, forwarding plane pre-processing, control packet determination, writing, and the like in the forwarding plane 101/201 may be implemented by hardware or hardware controlled by software. For example, if the forwarding plane circuit is an NP, these functions may be implemented by microcode in a memory within the NP. If the forwarding plane circuit is a forwarding core in the CPU, these functions may be implemented by the CPU by executing a program in the memory 103/203. For another example, reading, the AI pre-processing, and the like in the AI circuit 102/202 may be implemented by hardware or hardware controlled by software. Although the hardware AI acceleration engine is a hardware circuit, the AI algorithm is generally programmable and its program may be stored in a memory within the AI circuit 102. For another example, AI decision, the control plane collection, and the like in the control plane 105/210 may be implemented by hardware controlled by software. For example, if the control plane circuit is a CPU, these functions may be implemented by the CPU by executing a program in the memory 103.

Figure 3:
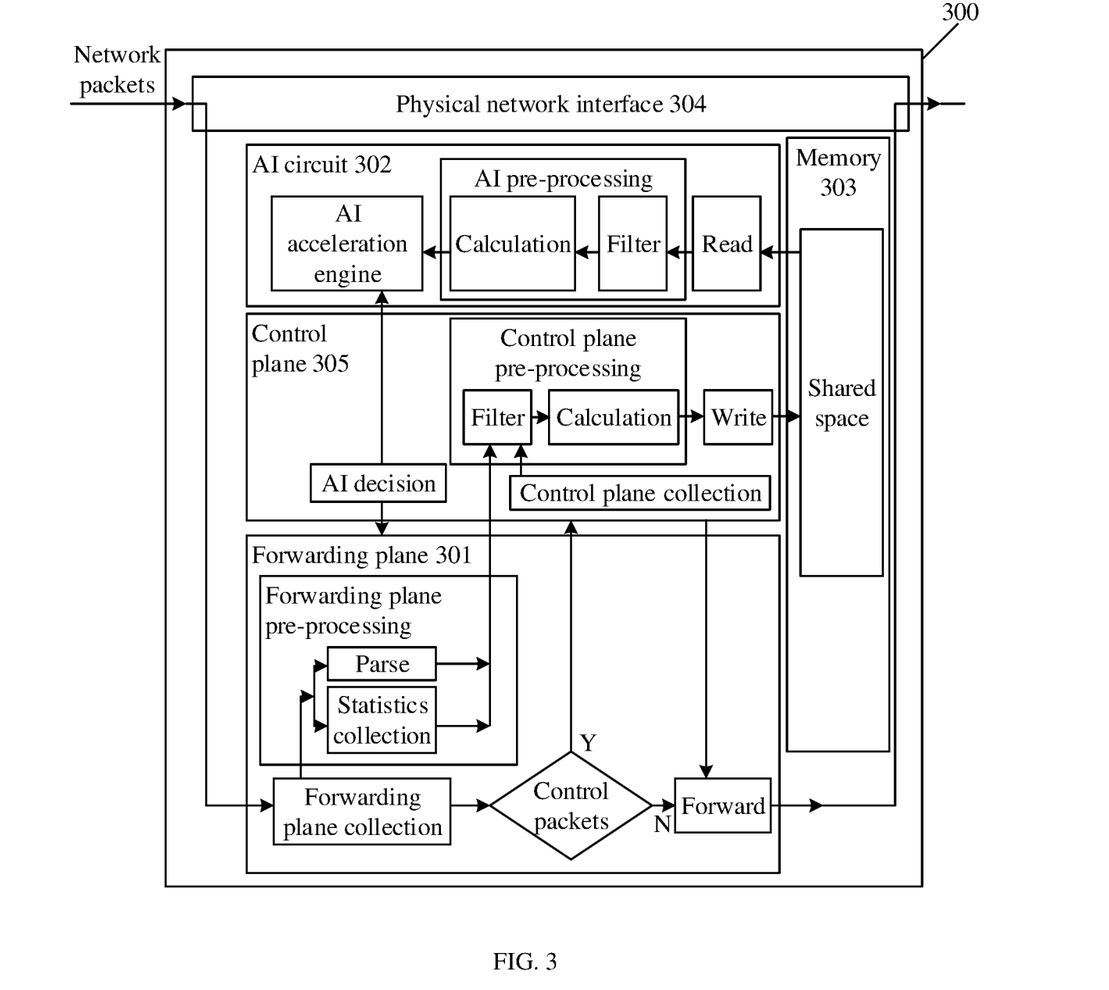
FIG. 3 is a schematic diagram of an example of a network device according to another embodiment.

Another embodiment is described below with reference to FIG. 3. FIG. 3 is a schematic diagram of an example of a network device according to another embodiment. The network device 300 shown in FIG. 3 includes a forwarding plane 301, an AI circuit 302, and a control plane 305. Unlike the embodiment shown in FIG. 1 and FIG. 2, the forwarding plane 301 and the AI circuit 302 in the embodiment shown in FIG. 3 are not directly coupled. Similar to the embodiment shown in FIG. 1 and FIG. 2, this embodiment does not require that the forwarding plane circuit and the AI circuit 302 be in the same chip. However, this embodiment may require that the forwarding plane 301 and the control plane 305 be implemented by different chips. If the AI circuit 302 and the control plane 305 are integrated together, the AI circuit 302 is not directly coupled to the forwarding plane 301, either. The network device 300 shown in FIG. 3 may further include a memory 303 and a physical network interface 304. The hardware implementation of the forwarding plane 301, the AI circuit 302, the memory 303, the physical network interface 304, and the control plane 305 in the network device 300 is similar to the hardware implementation of the forwarding plane 101, the AI circuit 102, the memory 103, the physical network interface 104, and the control plane 105 in the embodiment shown in FIG. 1, and the control plane circuit and the forwarding plane circuit are implemented by separate chips. For example, the control plane circuit includes a CPU; the forwarding plane circuit includes an NP, an ASIC, an FPGA, or any combination thereof; and the AI circuit 302 is in a separate chip, integrated in the CPU, or integrated in the NP. For another example, the communications device is a frame-shaped network device; the control plane is implemented by a main control card; the forwarding plane is implemented by a line card; and the AI circuit 302 is on the main control card or the line card, or on a separate card.

After receiving the network packets using the physical network interface 304, the forwarding plane 301 collects the network packets related to the AI processing and obtains data about the network packets. The process of collecting network packets is the same as that in the embodiment shown in FIG. 1 and FIG. 2. The forwarding plane 301 pre-processes the collected network packets, provides a result of the pre-processing to the control plane 305, or provides a result of the pre-processing and some or all of the network packets to the control plane 305. The procedure of pre-processing the network packets by the forwarding plane 301 is the same as that in the embodiment shown in FIG. 1 and FIG. 2. For example, the forwarding plane 301 may provide the data about the network packets to the control plane 305 using a bus or an internal network interface. The forwarding plane 301 pre-processes the collected network packets to share the burden of the control plane 305 and the AI circuit 302, so as to improve efficiency. For example, the forwarding plane 301 needs to parse some fields of the packets to forward the packets, and therefore, the processing capability of the forwarding plane 301 can be reused through pre-processing in the forwarding plane 301 without additional burden.

The forwarding plane 301 sends the control packets to the control plane 305 for processing. The control plane 305 may alternatively send data about the control packets and/or data about the status of the control plane to the AI circuit 302 for processing.

The control plane 305 may or may not pre-process the data about the control packets and the data about the network packets that is provided by the forwarding plane 301. A procedure of the control plane pre-processing is similar to the procedure of pre-processing the data about the network packets by the AI circuit 102/202 in the embodiment shown in FIG. 1 and FIG. 2, but is performed by a different circuit.

The control plane 305 provides to-be-analyzed data (the data about the network packets, the data about the control packets, data about a status of the control plane, or any combination thereof) to the AI circuit 302, and instructs the AI circuit 302 to process the to-be-analyzed data using a specified AI algorithm. Similar to the embodiment shown in FIG. 1 and FIG. 2, the control plane 305 may provide the to-be-analyzed data to the AI circuit 302 through internal data transfer or by using a bus, an internal communications interface, or a shared memory. A specific method used by the control plane 305 and the AI circuit 302 to transfer data in a shared memory manner is similar to that in the embodiment shown in FIG. 1 and FIG. 2.

The AI circuit 302 may or may not pre-process the to-be-analyzed data provided by the control plane 305. No operation is generally repeated in the control plane pre-processing and the AI pre-processing. A procedure of performing AI pre-processing by the AI circuit 302 is similar to that of the AI pre-processing in the embodiment shown in FIG. 1 and FIG. 2.

The AI circuit 302 may use a default AI algorithm to process the to-be-analyzed data. The AI circuit 302 may alternatively receive, from the control plane 305, an AI algorithm used to process the data, and then process the to-be-analyzed data using the AI algorithm indicated by the control plane 305. The AI circuit 302 uses a hardware AI acceleration engine to efficiently process the data about the network packet. A processing result of the AI circuit 302 may be sent to the control plane 305 and/or a network manager. The control plane 305 and/or the network manager may set a corresponding forwarding policy based on the processing result, and send the forwarding policy to the forwarding plane 301. The forwarding plane 301 executes the forwarding policy obtained through the AI processing.

Some of the functions implemented by the forwarding plane 301, the AI circuit 302, and the control plane 305 may be provided by hardware or software. For example, the collection, forwarding, forwarding plane pre-processing, control packet determination, writing, and the like in the forwarding plane 301 may be implemented by hardware or hardware controlled by software. For example, if the forwarding plane circuit is an NP, these functions may be implemented by microcode in a memory within the NP. For another example, reading, AI pre-processing, and the like in the AI circuit 302 may be implemented by hardware or by software controlled hardware. Although the hardware AI acceleration engine is a hardware circuit, the AI algorithm is generally programmable and its program may be stored in a memory within the AI circuit 302. For another example, the AI decision in the control plane 305, the control plane collection, and the like may be implemented by software. For example, if the control plane circuit is a CPU, these functions may be implemented by the CPU by executing a program in the memory 303.

All or some of the foregoing embodiments may be implemented by means of software, hardware, or a combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments are all or partially generated. The computer may be a general-purpose computer, a dedicated computer, a computer network, or other programmable apparatuses. The computer instructions may be stored in a storage medium or sent from one storage medium to another storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The storage medium may be any medium accessible by a computer, or a data storage device, such as a server or a data center, integrating one or more media. The usable medium may be a magnetic medium (for example, a floppy disk, a hard disk, or a magnetic tape), an optical medium (for example, an optical disc), a semiconductor medium (for example, a solid-state drive (SSD)), or the like.

The foregoing descriptions are merely specific embodiments, but are not intended to limit the protection scope of the disclosure. Any variation or replacement readily figured out by a person skilled in the art within the technical scope disclosed shall fall within the protection scope of the disclosure.

What is claimed is:

1. A network device comprising:
a forwarding plane;
a control plane; and
an artificial intelligence (AI) circuit directly coupled to the forwarding plane and configured to:
process first data directly from the forwarding plane and using a first AI algorithm, wherein the first data comprise data about network packets; and
process third data from the control plane using a second AI algorithm,
wherein the third data comprise data about control packets or a status of the control plane.

2. The network device of claim 1, further comprising a memory, wherein the memory comprises a first storage space, wherein the forwarding plane and the AI circuit are configured to share the first storage space, wherein the forwarding plane is configured to write the first data to the first storage space, and wherein the AI circuit is further configured to read the first data from the first storage space.

3. The network device of claim 1, wherein the forwarding plane is configured to pre-process the network packets to obtain the first data.

4. The network device of claim 3, wherein the forwarding plane is further configured to further pre-process the network packets by parsing the network packets and/or by obtaining first statistical data of a flow to which the network packets belong.

5. The network device of claim 1, wherein the AI circuit is further configured to:
obtain second data about the network packets based on the first data, wherein a calculation capability of the forwarding plane does not allow the forwarding plane to obtain the second data; and
process the second data using the first AI algorithm.

6. The network device of claim 5, wherein the AI circuit is further configured to:
remove abnormal data from the first data; or
obtain second statistical data of a flow to which the network packets belong when the calculation capability does not allow the forwarding plane to obtain the second statistical data.

7. The network device of claim 1, further comprising a memory, wherein the memory comprises a second storage space, wherein the control plane is a central processing unit (CPU), wherein the AI circuit comprises a chip separate from the CPU, wherein the CPU and the AI circuit are configured to share the second storage space, wherein the CPU is further configured to write the third data to the second storage space, and wherein the AI circuit is further configured to read the third data from the second storage space.

8. The network device of claim 1, further comprising a control plane, wherein the control plane is a central processing unit (CPU), and wherein the AI circuit comprises a chip separate from the CPU.

9. The network device of claim 1, further comprising a control plane, wherein the control plane and the AI circuit are integrated in a chip, wherein the chip is a processor, and wherein the AI circuit comprises a core or a heterogeneous calculation circuit of the processor.

10. A network device comprising:
a forwarding plane configured to obtain first data by parsing network packets and/or by obtaining first statistical data of a flow to which the network packets belong;
an artificial intelligence (AI) circuit; and
a control plane configured to:
obtain the first data from the forwarding plane;
pre-process the first data to obtain second data; and
instruct the AI circuit to process to-be-analyzed data comprising the first data or the second data,
wherein the AI circuit is configured to process the to-be-analyzed data using an AI algorithm.

11. The network device of claim 10, wherein the control plane is further configured to further pre-process the first data by obtaining second statistical data of the flow to which the network packets belong, and wherein a calculation capability of the forwarding plane does not allow the forwarding plane to obtain the second statistical data.

12. The network device of claim 10, wherein the to-be-analyzed data comprises the first data, and wherein the AI circuit is further configured to:
obtain third data about the network packets based on the first data, wherein a calculation capability of the forwarding plane does not allow the forwarding plane to obtain the third data; and
process the third data using the AI algorithm.

13. The network device of claim 12, wherein the AI circuit is further configured to:
remove abnormal data from the first data; or
obtain third statistical data of the flow to which the network packets belong when the calculation capability does not allow the forwarding plane to obtain the third statistical data.

14. The network device of claim 10, further comprising a memory, wherein the memory comprises a storage space, wherein the control plane is a central processing unit (CPU), wherein the AI circuit comprises a chip separate from the CPU, wherein the CPU and the AI circuit are configured to share the storage space, wherein the CPU is further configured to write the to-be-analyzed data into the storage space, and wherein the AI circuit is further configured to read the to-be-analyzed data from the storage space.

15. A method implemented by a network device and comprising:
receiving, by an artificial intelligence (AI) circuit of the network device and from a forwarding plane of the network device, first data without the first data passing through a device external to the network device, wherein the AI circuit is directly coupled to the forwarding plane;
processing the first data using a first AI algorithm, wherein the first data comprise data about network packets; and
processing third data from a control plane using a second AI algorithm,
wherein the third data comprise data about control packets or a status of the control plane.

16. The method of claim 15, further comprising:
sharing, by the forwarding plane and the AI circuit, a first storage space of a memory;
writing, by the forwarding plane, the first data to the first storage space; and
reading, by the AI circuit, the first data from the first storage space.

17. The method of claim 15, further comprising pre-processing, by the forwarding plane, the network packets to obtain the first data.

18. The method according to claim 17, wherein the pre-processing comprises parsing the network packets or obtaining first statistical data of a flow to which the network packets belong.

19. The method of claim 15, further comprising:
obtaining, by the AI circuit, second data about the network packets based on the first data, wherein a calculation capability of the forwarding plane does not allow the forwarding plane to obtain the second data; and
processing, by the AI circuit, the second data using the first AI algorithm.

20. The method of claim 19, further comprising:
removing, by the AI circuit, abnormal data from the first data; and
obtaining, by the AI circuit, second statistical data of a flow to which the network packets belong when the calculation capability does not allow the forwarding plane to obtain the second statistical data.

21. The method of claim 13, further comprising:
sharing, by a central processing unit (CPU) and the AI circuit, a second storage space of a memory;
writing, by the CPU, the third data into the second storage space; and
reading, by the AI circuit, the third data from the second storage space.

22. A method implemented by a network device and comprising:
obtaining, by a forwarding plane, first data by parsing network packets or by obtaining first statistical data of a flow to which the network packets belong;
obtaining, by a control plane and from the forwarding plane, the first data;
pre-processing, by the control plane, the first data to obtain second data;
sending by the control plane and to an artificial intelligence (AI) circuit, an instruction to process to-be-analyzed data comprising the first data or the second data; and
processing, by the AI circuit, the to-be-analyzed data using an AI algorithm.

23. The method of claim 22, wherein the pre-processing comprises obtaining second statistical data of the flow to which the network packets belong, and wherein a calculation capability of the forwarding plane does not allow the forwarding plane to obtain the second statistical data.

24. The method of claim 22, wherein the to-be-analyzed data comprises the first data, and wherein the method further comprises:
- obtaining, by the AI circuit, third data about the network packets based on the first data, wherein a calculation capability of the forwarding plane does not allow the forwarding plane to obtain the third data; and
- processing the third data using the AI algorithm.

25. The method of claim 24, further comprising:
- removing, by the AI circuit, abnormal data from the first data; or
- obtaining, by the AI circuit, third statistical data of the flow to which the network packets belong when the calculation capability does not allow the forwarding plane to obtain the third statistical data.

26. The method of claim 22, further comprising:
- sharing, by a central processing unit (CPU) and the AI circuit, a storage space of a memory;
- writing, by the CPU, the to-be-analyzed data into the storage space; and
- reading, by the AI circuit, the to-be-analyzed data from the storage space.

27. The method of claim 15, wherein the network device further comprises a control plane, wherein the control plane is a central processing unit (CPU), and wherein the AI circuit comprises a chip separate from the CPU.

28. The method of claim 15, wherein the network device further comprises a control plane, wherein the control plane and the AI circuit are integrated in a chip, wherein the chip is a processor, and wherein the AI circuit comprises a core or a heterogeneous calculation circuit of the processor.

* * * * *

UNITED STATES PATENT AND TRADEMARK OFFICE
CERTIFICATE OF CORRECTION

PATENT NO. : 11,477,126 B2
APPLICATION NO. : 17/090550
DATED : October 18, 2022
INVENTOR(S) : Xin Li et al.

It is certified that error appears in the above-identified patent and that said Letters Patent is hereby corrected as shown below:

In the Claims

Claim 21, Column 14, Line 41: "claim 13" should read "claim 15"

Signed and Sealed this
Twentieth Day of December, 2022

*Katherine Kelly Vidal*

Katherine Kelly Vidal
*Director of the United States Patent and Trademark Office*